July 13, 1965  E. A. HAWK, SR  3,194,191
POWDER FEED WELDING TORCH
Filed Nov. 18, 1963  3 Sheets-Sheet 1
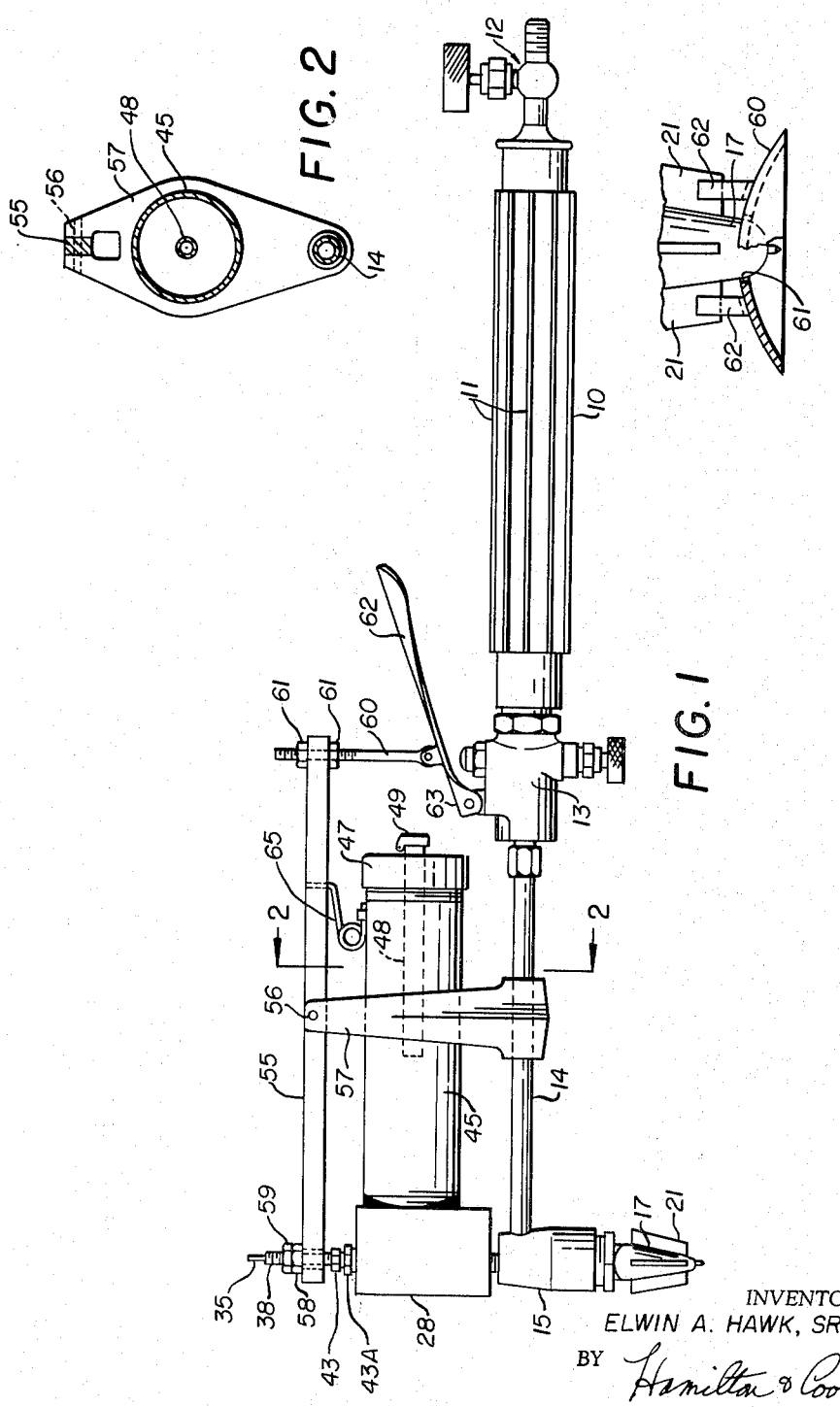
INVENTOR.
ELWIN A. HAWK, SR.
BY Hamilton & Cook
ATTORNEYS July 13, 1965

E. A. HAWK, SR 3,194,191

POWDER FEED WELDING TORCH

Filed Nov. 18, 1963

INVENTOR.
ELWIN A. HAWK, SR.
BY Hamilton & Cook

ATTORNEYS

INVENTOR.
ELWIN A. HAWK, SR.
BY Hamilton & Cook
ATTORNEYS

3,194,191
POWDER FEED WELDING TORCH
Elwin A. Hawk, Sr., East Rochester, Ohio, assignor to John Hydock, Canton, Ohio
Filed Nov. 18, 1963, Ser. No. 325,522
14 Claims. (Cl. 110—22)

This is a continuation-in-part of application Serial No. 214,568, filed August 3, 1962, now abandoned.

The invention relates generally to welding torches, and more particularly to an improved torch for feeding powdered welding material through the burner tip to continuously melt said material in the gas flame impinging the workpiece being welded.

Powdered material for welding torches may be finely divided of the order of 300 to 400 mesh, and such material is difficult to feed at a constant rate without clogging through a small passageway such as is required in the burner tip of a welding torch.

Certain prior constructions have fed the powdered material through the same passageway as the gas mixture, and while this substantially prevents clogging, there is an ever present hazard, especially when the torch is hot, as the ignited particles tend to back up in the common passageway and ultimately cause explosion in the powder reservoir attached to the torch. This hazard is further aggravated by the ignited particles rebounding from the surface of the workpiece in the common passageway.

It is an object of the present invention to provide an improved powder feed welding torch in which the gas and powdered welding material are fed to the burner tip in separate passageways.

A further object is to provide such a torch adapted for feeding flux material to the burner tip independently of the powdered welding material.

Another object is to provide such a torch in which the powdered material is a gravity feed manually controlled.

A further object is to provide such a torch having improved means for providing a continuous feed of finely divided material without clogging.

Another object is to provide means for adjusting the velocity of powder discharge from the burner tip.

Another object is to provide valve means for automatically shutting off the powder feed when the manual control is not operated.

A further object is to provide improved resilient tube means for biasing the powder feed valve means to closed position.

A still further object is to provide an improved burner construction for promoting cooling at the tip while at the same time decreasing any likelihood of back ignition in the powder feed passageway.

Finally, it is an object of the present invention to provide a novel and improved powder feed welding torch construction which is inexpensive to construct, safe to operate, and adapted to be embodied in conventional gas welding torches.

These objects, and other which will become apparent from the following description, are accomplished by the improvements comprising the present invention, a preferred embodiment of which is shown and described herein as an example of the best known mode of carrying out the invention. Various modifications and changes in construction are embraced within the scope of the appended claims.

The novel torch has a passageway axially of the burner tip through which the powdered material is fed by gravity from an upper reservoir, and a hollow needle extends axially through said passageway and is adjustable axially therein. The needle has valving elements thereon biased to close off the passageway and is manually reciprocated to open and close the passageway, at the same time agitating the powdered material in the passageway to prevent clogging. The hollow needle projects upwardly interiorly of the torch to an external chamber so that flux material may be fed to the tip through the hollow needle. The gas passages are separate from the powdered material passageway all the way to a rounded end tip where they discharge at a minimum radial distance outwardly of said passageway to promote cooling and prevent back ignition of the tip.

Referring to the drawings hereof:

FIG. 1 is a side elevation of a powder feed welding torch embodying the invention.

FIG. 2 is a sectional view on line 2—2 of FIG. 1.

FIG. 6 is an enlarged side elevation, partly in section, of a portion of the tip with a reflector attachment mounted thereon.

Figures 3, 4, 5:
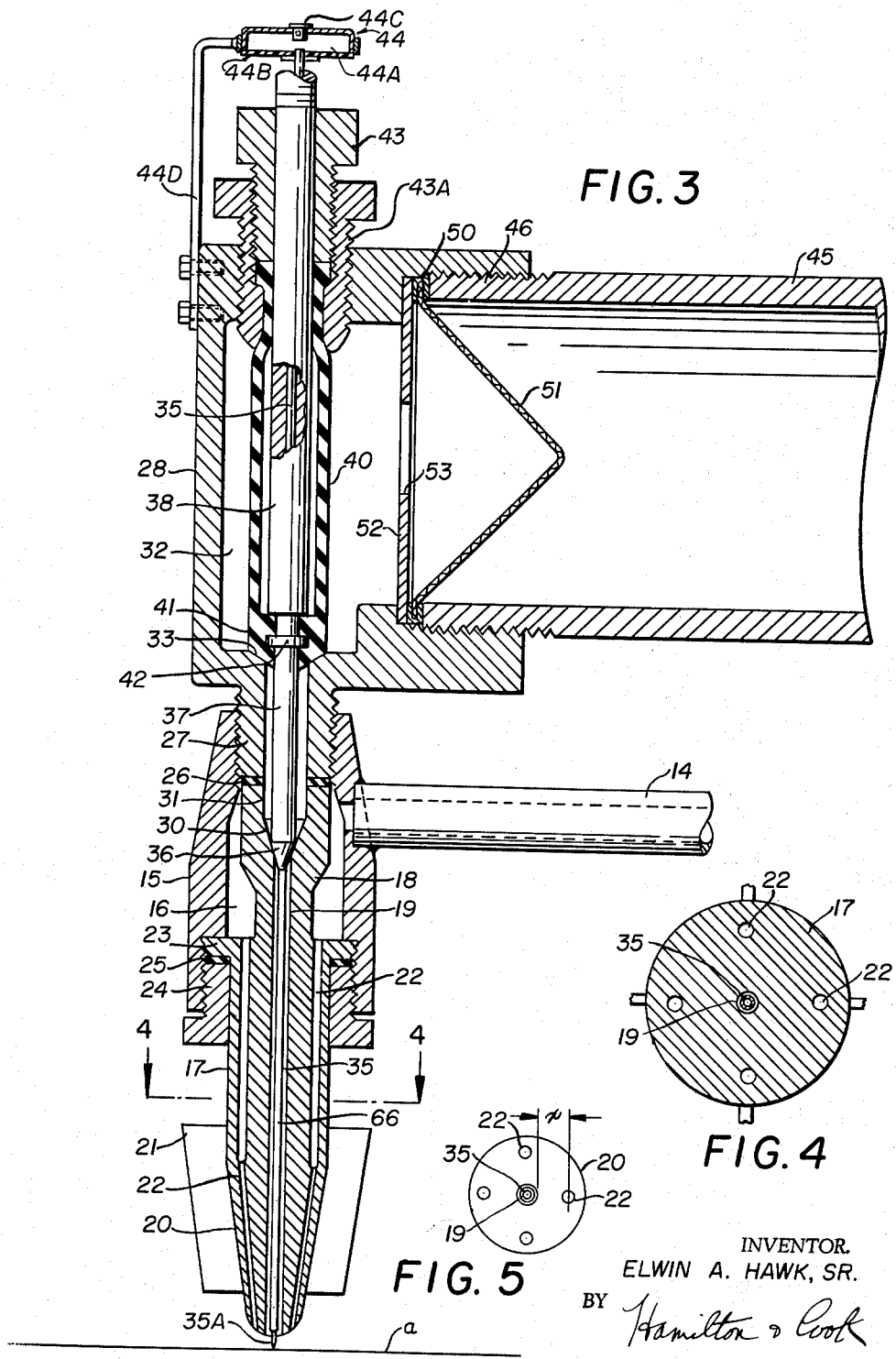
FIG. 3 is an enlarged vertical section of the burner end thereof.
FIG. 4 is a cross section on line 4—4 of FIG. 3, distant parts being removed.
FIG. 5 is a bottom end view of the burner tip, distant parts being removed.

The welding torch shown in FIG. 1 has a conventional tubular handle portion 10 with exterior longitudinal ribs 11 and provided at its outer end with a shut-off valve connection 12 for supplying gas for combustion at the burner tip. A single connection 12 for supplying a mixture of oxygen and acetylene may be provided as shown, or two connections may be provided, one for each gas, and the gases mixed within the tubular handle 10. In either case the desired gas mixture is fed from the handle through the regulating valve 13 and an extension pipe 14 to the burner 15.

The burner 15 has an interior chamber 16 with which the pipe 14 communicates, and a burner tip 17 is screwed into the lower end of the housing. Preferably, the upper end of the tip comprises a neck 18 of reduced diameter extending axially through the chamber 16, and an axial powder feed passageway 19 extends through the neck portion and tip to the bottom end thereof. As shown in FIG. 3, the end portion 20 of the tip is tapered, with the bottom end surface convexly rounded for a purpose to be described. Cooling elements are preferably provided on the end portion 20 of the tip. While these fins may be peg-like projections or annular fins, it has been found that the use of longitudinal fins 21, as shown provide a desirable secondary effect. These longitudinal fins 21 not only provide an increased surface area from which the heat at the tip can radiate, but are also conducive to the establishment of convection currents upwards past the sides of the tip between the fins themselves. In cooling the tip, these convection currents are themselves heated, and as they flow upwardly along the nozzle they in turn warm the powder flowing through the powder feed passageway, thus reducing the moisture content therein and facilitating the application of the powder to the work surface.

Below the neck 18, the tip is provided with a plurality of gas passageways 22 (four being shown) which are radially spaced outward of the passageway 19, and which communicate at their upper ends with chamber 16. Thus, the gas ports are entirely separate from the powder port.

Preferably, the tip 17 is provided with a threaded flange 23 which is screwed into the lower end of the housing, and a gland nut 24 is also screwed into the housing and abuts a sealing gasket 25 of suitable material. The upper end of the neck 18 may abut a sealing gasket 26 backed up against a threaded projection 27 screwed into the upper end of burner 15 and extending downwardly from a powder feed housing 28.

Within the neck 18 of the tip 17, the passageway 19 tapers radially outward and upward to form a tapered annular seat 30 which merges into an enlarged coaxial passageway 31, which continues upwardly through gasket 26 and projection 27 into the chamber 32 formed within housing 28. Preferably, an annular tapered seat 33 is formed around the upper end of passageway 31 where it enters chamber 32.

Figure 8:
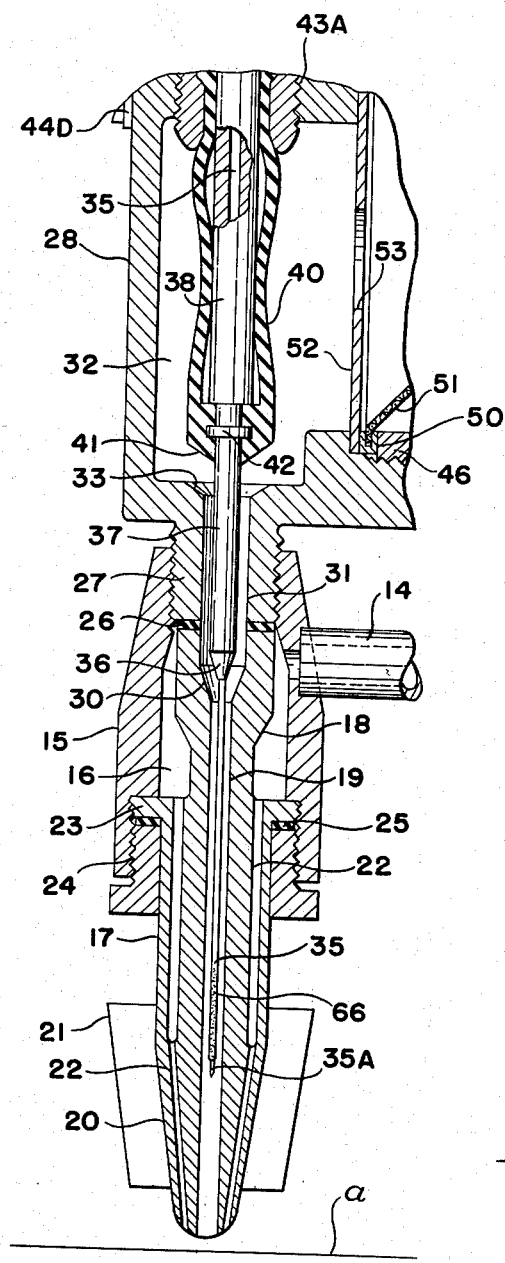
FIG. 8 is a fragmentary view similar to FIG. 3 showing the powder feed valve means open and the end of the hollow needle adjusted to a different position in the powder feed passageway.

A needle 35 is mounted for axial movement in passageway 19, the needle having a substantially smaller diameter than the passageway 19, to permit finely divided material to flow by gravity down through the annular space between the needle and the wall of the passageway. The needle has a slidable friction fit in the base of a cylindrical rod 38 having a lower portion 37 of reduced diameter, so that the needle will normally move with the rod but can be adjusted axially thereof to position the end of the needle at various positions in passageway 19, as indicated in FIG. 8.

A tapered shoulder 36 on the lower end of the rod portion 37 acts as a valving element normally seating on annular seat 30 to close off passageway 31. The upper rod portion 37 extends through passageway 31, and rod portion 38 extends through chamber 32 and out through the top thereof.

A resilient sleeve 40 of rubber or the like is mounted on rod 38, and the lower end of the sleeve preferably fits around the upper part of portion 37 and has a tapered end 41 which normally conforms to the seat 33 at the top of passageway 31 for closing off said passageway. Both the tapered end 41 and the tapered shoulder 36 are thus valving elements on the needle 35. Preferably, a collar 42 is formed on rod portion 37 within the end 41, to ensure unseating the end 41 when the needle is moved axially upward.

The upper end of sleeve 40 may be held in a bushing 43A screwed in the upper end of housing 28, and the upper end of the sleeve is abutted by a gland nut 43 screwed into the bushing for effecting a seal around tube 38. The upper end of tube 38 protruding from the gland nut may be threaded as shown. The needle 35 extends continuously from the burner tip to above the gland nut 43, and may be a hollow needle of dimensions such as a conventional hypodermic needle. The tiny bore of the needle may be used to supply fluxing material to the burner tip during welding in gaseous, liquid or powder form. A suitable fitting (not shown) may be connected to the upper threaded end of tube 38 for feeding fluxing material through the bore of the needle. For some embodiments it may be desirable to provide a cat whisker 35A on the lower extremity of needle 35. The cat whisker 35A would extend longitudinally beyond the opening 19 in the nozzle and beyond the point where the longitudinal bore through the needle vents to discharge the fluxing fluid. The cat whisker would provide a means for agitating the powder at the passageway 19 to prevent clogging.

The powder feed housing 28 is preferably connected at one side with a powder container or reservoir 45, which may have its open end 46 screwed into the housing for communicating with chamber 32 therein. The opposite end of container 45 may have a removable cap 47 screwed thereon through which a vent tube 48 projects into the container a substantial distance. A hinged gravity operated cap 49 closes the vent tube when the torch is not operated.

The open end 46 of the container preferably abuts a sealing gasket 50 in which is mounted the rim of a conical screen 51 extending into container 45. A baffle plate 52 is mounted in front of screen 51 and has a central opening 53. The container reservoir is filled with the desired finely divided or powdered welding material. The particle size as well as the nature of the material may vary considerably according to welding requirements. For example, the material may be a metal such as nickel or a mixture or alloy of two or more metals such as nickel and boron, nickel and iron, or nickel and copper, or may be a ceramic material or a combination of both. The particle size may vary from 8 mesh to 325 mesh, according to requirements.

The means for moving the needle axially to open the passageways 19 and 31 is preferably a hand operated lever and link arrangement connected to the protruding upper end of tube 38, as shown in FIGS. 1 and 2. A lever 55 may be pivoted intermediate its ends on a pin 56 in the upper end of a bracket 57 carried on container 45 and pipe 14. The forward end of lever 55 fits slidably over the protruding end of tube 38, and is restricted against upward movement relative thereto by an adjusting nut 58 and lock nut 59 screwed onto tube 38. The rearward end of lever 55 fits slidably over a threaded link 60 between two stop nuts 61 threaded thereon. The bottom end of link 60 is pivoted to a handle lever 62 which is pivoted at one end 63 to the housing of adjusting valve 13.

Thus, downward pressure on the free end of handle 61 will move the tube 38 axially upward in housing 28, resulting in lifting the end 41 of the sleeve off its seat 33 by longitudinally compressing the resilient sleeve 40 which normally biases the end 41 against its seat 33. At the same time, the shoulder 36 is lifted off its seat 30, thus opening the connecting passageways 31 and 19 to the chamber 32. The amount of movement imparted by the lever and link arrangement can be nicely adjusted by manipulation of the nuts 58, 59 and 61. A supplemental spring 65 may be interposed between the container 45 and the rear portion of lever 55 to ensure that the sleeve biases the needle valves to close position when the handle 62 is released. If a fluxing material is not required, a powder starting chamber may be utilized. The starting chamber indicated generally by the numeral 44 is comprised of an air chamber 44A, all the walls of which except the lower wall 44B are rigid. The wall, or diaphragm, 44B is made of a flexible material and is secured to the sides of the needle 35, the passageway through which opens into the chamber 44A. A check valve 44C, such as the ball and seat arrangement shown, permits free flow of air from the atmosphere into the chamber 44A but prevents its return flow. The chamber itself is fixed relative to the torch by a supporting leg 44D mounted to the feed housing 28 by suitable means and attached to the rigid walls of the chamber. Thus, when the handle 62 is depressed to permit the flow of powder through the tip, the upward movement of needle 35 causes the diaphragm to be moved upwardly, compressing the air in the chamber 44. The compressed air then flows downwardly through the passageway in needle 35, escaping as a small puff of air which clears the passageway 19 at the tip of the nozzle as the powder begins to flow.

It is apparent that the improved powder feed welding torch is readily adapted to be embodied in a conventional welding torch construction, as the powder reservoir and housing are carried on the burner housing. However, it must be emphasized that when using powders with the torch herein described, oxidation should be limited to prevent the powder from igniting. Hence, there should always be an excess of acetylene over the amount that would be completely consumed with the oxygen supply—i.e., a carburizing flame is utilized.

As previously stated, fluxing material in gaseous, liquid or powder form may be supplied through the bore of needle 35 to the burner tip. Such material may be hydrogen, nitrogen or chlorine to provide a reducing atmosphere at the weldment or may be an inert gas or gases such as argon or helium. Other gases such as carbon dioxide or sulfur dioxide may be used to accomplish desired results. Under certain conditions finely divided powder may be entrained in the fluxing gas. For example, if a brass powder is being fed through the powder feed passageway 19, a small amount of zinc powder may be fed through the needle with a gas flux, so as to replace zinc lost in the brass powder during welding. Similarly, for welding with powdered nickel, cobalt and similar metals, a small amount of magnesium may be used with a controlling atmosphere gas, such as chlorine, to form magnesium chloride as a flux for the weldment.

In the operation of improved torch, the workpiece, the surface of which is represented by line $a$, is preheated by the torch with the powder passageways 19 and 31 closed. Preferably, the workpiece is heated to slightly below the melting temperature of the powder being used. This ensures that unmelted powder will not build up on the workpiece during welding.

Figure 9:
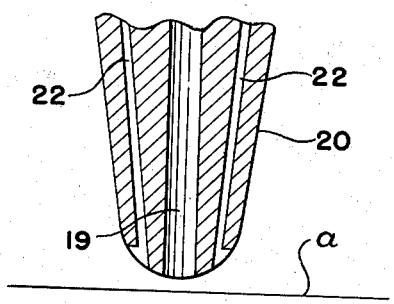
FIG. 9 is an enlarged fragmentary sectional view of the tip end.

Next, the powder is fed through the passageway 19 by manipulating the handle 62. The use of the resilient rubber sleeve 40 to bias the end 41 thereof against its seat 33 and the valving shoulder 36 against its seat 30 is extremely advantageous because there are no open parts exposed to the powder in chambers 31 and 32. If metallic spring means were used to accomplish the biasing action, the finely divided powder would quickly clog the moving parts and interfere with the spring action. The use of the resilient sleeve insures proper resilient action at all times. In order to prevent clogging of the powder in the bore 19, the needle 35 is preferably roughened or serrated, as indicated at 66, so that it agitates the surrounding powder every time it is moved up and down. As shown in FIGS. 5 and 9, the lower end of the needle may terminate at the discharge end of the passageway 19 or at a point within said passageway and considerably above its lower end.

It is very important to maintain the temperature of the end of the tip relatively cool during the welding operation, and this is partially accomplished by the cooling fins 21. However, as the tip is moved close to the workpiece, as shown in FIG. 3, the outer rim of the tip end should be relieved to avoid rebounding of ignited particles into the discharge end of the powder passageway 19, causing added heating of the tip. This relief is accomplished by convexly rounding the tip to direct the ignited rebounding particles radially outward. In addition, the gas outlet ports of passageways 22 may be slotted radially outwardly of the ports as shown at 22A in FIG. 9. These slots allow gas to escape laterally even though the rounded tip is inclined and held close to the work surface, which would otherwise tend to trap the gas discharging from the circular outlet port, and to direct the gas back into the powder passageway. It has been found in actual practice that the radial distance (FIG. 5) between the end of port 19 and the ends of ports 22 should not be less than 3/32 inch, in order to maintain proper cooling conditions.

This tendency is similarly augmented by having the axes of the ports 22 converge at a distance of 2½–3 inches below the tip of the nozzle. By thus increasing the convergent distance to be several times greater than that of the standard welding tip, the heart of the flame is correspondingly moved away from the tip of the nozzle, adding to the cooling conditions present.

An additional cooling effect can be achieved by the use of a heat shield such as a reflector attachment 60. Reflector attachment 60 comprises a downwardly concave dished plate having a centrally located bore 61 through which the burner tip 17 protrudes, or the shield may be spaced below the tip. A plurality of spring clips 62 are used to detachably mount the attachment 60 by engaging the lower ends of fins 21. The concavity of the device, together with the use of a highly reflective, heat-resisting material to form the concave surface provides a heat focusing effect which tends to insulate the burner tip and the remainder of the torch from the heat of the flame while at the same time providing a greater intensity of heat at the work area. To obtain a similar result, the heat shield may take the form of a confining tube of carbonaceous material, which also will reduce the oxygen content in the surrounding atmosphere.

Figure 7:
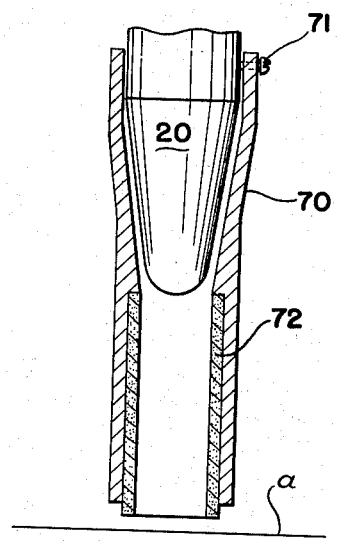
FIG. 7 is a similar view of a portion of the tip with a heat intensifier tube mounted thereon.

Referring to FIG. 7, the confining or heat intensifying tube preferably comprises an outer tube 70 of heat resistant alloy such as "nichrome" which is attached to the burner tip 20 as by a set screw 71. The tube 70 is lined with a carbon tube 72 which furnishes carbon to combine with any oxygen present at the weld and produce $CO_2$, thus maintaining a nonoxidizing atmosphere around the weldment.

As the powder is fed from the container 45, the screen 51 promotes uniformity of particle size and prevents coagulation of the particles. The baffle provides a dam so that when the torch is tilted a reservoir of material is retained back of the baffle, to insure a substantially constant supply.

Adjusting the end of needle 35 up or down within the powder passageway 19 permits regulation of the powder feed according to the size and kind of powder being used. For example, if a high melting point powder is used the velocity of the powder feed should be relatively slow so that the particles will melt on the work surface and not deflect or bounce away from it. If a low melting point powder is used its velocity must be relatively high to allow the particles to reach the work surface without melting or coagulating at the discharge port of the tip.

Adjustment of the needle augments the gravity flow of the powder through passageway 19 when the valves 36 and 41 are open, especially in the case of the more finely divided powders. When the tip of the needle projects slightly beyond the burner tip, the flow of powder is entirely gravity flow. Slight withdrawal of the tip into passageway 19 slightly increases the velocity of powder flow, but as the needle tip is withdrawn a substantial distance such as shown in FIG. 9, the powder in front of the needle tip causes back pressure at the entrance port formed by the seat 30, retarding the flow of incoming powder.

If the needle is withdrawn far enough the powder flow may stop momentarily and then as the pressure builds up against the incoming powder it will suddenly discharge powder collected in front of the needle tip which reduces pressure and allows increased flow until the pressure builds up again, resulting in a pulsating action. This pulsating effect is desirable in drive fine powder against the metal surface.

Slight adjustments in the position of the needle tip will regulate the frequency of pulsation as desired. Also, the frequency can be regulated by changing the pressure of the fluxing gas introduced into the needle. Obviously, the amount of gas fed through the needle is relatively small in comparison to the fuel gas and is regulated according to the kind and mesh of powder being used. As an example, for nickel-boron metal powder of 150 mesh, I have successfully used an atmosphere controlling gas pressure to the needle of ½ to 4 pounds per square inch, with a fuel gas pressure of 3–6 pounds per square inch.

It will be apparent that the improved torch is extremely safe because the powder port is entirely separate from the gas ports; and because the powder port is normally closed off from the powder reservoir, except when the handle 62 is manipulated. The hollow needle provides means for preventing clogging in the powder port and also provides for conducting flux to the burner tip inside of the gas ports.

What is claimed is:
1. Welding torch construction including a burner having a tip, an axial passageway extending through said burner and said tip, at least one gas passageway in said tip spaced radially from said axial passageway, means supplying gas to said radially spaced passageway, means supplying powdered welding material to said axial passageway, a needle movable in said axial passageway having a valving element normally internally closing said axial passageway, and manually operated means for axially moving said needle to open and close said axial passageway to provide controlled gravity feed of the powdered welding material and to agitate the powdered welding material therein.

2. Welding torch construction including a burner having a tip, an axial passageway extending through said burner and said tip, at least one gas passageway in said tip spaced radially from said axial passageway, means supplying gas to said radially spaced passageway, means supplying powdered welding material to the inner end of said axial passageway, a needle movable in said axial passageway, a resilient sleeve on said needle having one end normally internally closing said axial passageway, and manually operated lever means for axially moving said needle to compress said sleeve and open said axial passageway to provide controlled gravity feed of the powdered welding material and to agitate the powdered welding material therein.

3. Welding torch construction including a burner having a tip, an axial passageway extending through said burner and said tip, gas passageways in said burner tip spaced radially from said axial passageway, gas supply means connected to said burner and communicating with said gas passageways, a powder feed housing connected to said burner and communicating with the burner end of said axial passageway, a hollow needle extending in spaced relation through said axial passageway and through said powder feed housing, a valving element on said needle normally closing off the burner end of said axial passageway, a resilient sleeve on said needle within said powder feed housing having one end normally closing off said axial passageway, serrations on the exterior surface of the portion of said needle extending through said axial passageway, and manually operated lever means for axially moving said needle to compress said sleeve and open said passageway to feed powder by gravity through said tip and to agitate the powder passing through said axial passageway and prevent clogging.

4. Welding torch construction including a burner having a tip, an axial passageway extending through said burner and said tip, gas passageways in said burner tip spaced radially from said axial passageway, gas supply means connected to said burner and communicating with said gas passageways, a powder feed housing connected to said burner and communicating with the burner end of said axial passageway, a powder reservoir mounted on and communicating with the side of said feed housing, a baffle plate having a center opening located between said reservoir and said powder housing to promote constant flow of powder when the burner is tipped, a needle extending in spaced relation through said axial passageway and having a valving element normally closing the burner end thereof, lever means to axially move said needle to open said axial passageway, and means biasing said needle axially to close said axial passageway and agitate the powder therein.

5. Welding torch construction including a burner having a tip, an axial passageway extending through said burner to said tip, gas passageways in said burner tip spaced radially from said axial passageway, gas supply means connected to said burner and communicating with said gas passageways, a powder feed housing connected to said burner and communicating with said axial passageway, a hollow needle extending in spaced relation through said axial passageway and through said powder feed housing, an air chamber communicating with said hollow needle, a shoulder on said needle normally closing off said axial passageway, and manually operated means for axially moving said needle to open said axial passageway to feed powder by gravity through said tip, said axial movement compressing the air in said air chamber and forcing it outwardly through said hollow needle, the outer surface of said needle within said axial passageway having elements to agitate the powder passing through said axial passageway and prevent clogging.

6. Welding torch construction including a burner having a tip, an axial passageway extending through said burner and said tip, at least one gas passageway in said tip spaced radially from said axial passageway, means supplying gas to said radially spaced passageway, means supplying powdered welding material to the burner end of said axial passageway, a needle movable in said axial passageway having a valving element normally closing the burner end of said axial passageway, manually operated lever means for axially moving said needle to open said axial passageway and to agitate the powder therein, and a heat shield surrounding said tip having a carbon lining, said heat shield acting to confine the heat generated below the tip and to maintain a non-oxidizing atmosphere around the weldment.

7. Welding torch construction including a burner having a tip, an axial passageway extending through said burner and said tip, at least one gas passageway in said tip spaced radially from said axial passageway, means supplying gas to said radially spaced passageway, means supplying powdered welding material to the burner end of said axial passageway, a hollow needle having a discharge tip axially movable in said axial passageway and having a valving element thereon normally closing the burner end of said axial passageway, said needle being adjustable in said valving element axially of said passageway, and manually operated means for axially moving said valving element and said needle to open and close said passageway and to agitate the powder therein.

8. Welding torch construction including a burner having a tip, an axial passageway extending through said burner and said tip, at least one gas passageway in said tip spaced radially from said axial passageway, means supplying gas to said radially spaced passageway, means supplying powdered welding material to the burner end of said axial passageway, a hollow needle having a discharge tip axially movable in said axial passageway and having a valving element thereon normally closing the burner end of said axial passageway, said needle being adjustable in said valving element axially of said passageway, a resilient sleeve on said needle biasing said valving element toward closed position, and manually operated means for axially moving said valving element to compress said sleeve and open said passageway and to agitate the powder therein.

9. Welding torch construction including a burner having a tip, an axial passageway extending through said burner and tip, fuel gas passageways in said burner tip spaced radially from said axial passageway, a powder feed compartment connected to said burner and communicating with the burner end of said axial passageway, a hollow needle extending in spaced relation through said axial passageway and said powder feed housing and having a discharge tip, valve means carried by the needle to close the burner end of said axial passageway, said needle being axially adjustable in said valve means to adjust the position of the discharge tip in said axial passageway, and manually operated means for axially moving said valve means and said needle to open and close said axial passageway and to agitate the powder therein.

10. Welding torch construction including a burner having a tip, an axial passageway extending through said burner and tip, fuel gas passageways in said burner tip spaced radially from said axial passageway, a powder feed compartment connected to said burner and communicating with the burner end of said axial passageway, a hollow needle extending in spaced relation through said axial passageway and said powder feed housing and having a discharge tip, valve means carried by the needle to close the burner end of said axial passageway, said needle being axially adjustable in said valve means to adjust the position of the discharge tip in said axial passageway, a resilient sleeve on said needle in said powder feed compartment biasing said valve means toward closed position, and manually operated means for axially moving said valve means to compress said sleeve and open said axial passageway and to agitate the powder therein.

11. Welding torch construction including a burner having a convexly rounded tip, an axial passageway extending through said burner and said tip, means feeding powdered welding material to and through said passageway, a plurality of gas supply passageways spaced radially outward from said axial passageway and terminating in the convexly rounded tip, whereby the ignited gas particles rebounding from a work surface adjacent the tip are deflected outwardly from said axial passageway, and an escape slot at the convexly rounded tip end of each gas supply passageway extending radially outward therefrom to the surface of said convexly rounded tip, thereby reducing the trapping of gases between a work piece and said convexly rounded tip.

12. Welding torch construction including a burner having a convexly rounded tip, an axial passageway extending through said burner and said tip, means feeding powdered welding material to and through said passageway, a plurality of gas supply passageways spaced radially outward from said axial passageway and terminating in the convexly rounded tip at a distance not less than $3/32$ inch, whereby the ignited gas particles rebounding from a work surface adjacent the tip are deflected outwardly from said axial passageway, and an escape slot at the convexly rounded tip end of each gas supply passageway extending radially outward therefrom to the surface of said convexly rounded tip, thereby reducing the trapping of gases between a work piece and said convexly rounded tip.

13. Welding torch construction including a burner having a tip, an axial passageway extending through said burner and said tip, at least one fuel gas passageway in said tip spaced radially from said axial passageway, means for feeding powdered welding material to the burner end of said axial passageway, a needle movable in said axial passageway having a valve element normally closing the burner end of said axial passageway, manually operated means to axially move said valve element and needle to open and close said axial passageway and to agitate the powder therein, and a heat intensifier tube having a carbon liner surrounding and extending beyond said burner tip.

14. Welding torch construction including a burner having a tip, an axial passageway extending through said burner and said tip, at least one fuel gas passageway in said tip spaced radially from said axial passageway, means for feeding powdered welding material to the burner end of said axial passageway, a hollow needle movably spaced in said axial passageway and having a valve element normally closing the burner end of said axial passageway, said needle being axially adjustable in said valve element to adjust the tip of said needle in said passageway, manually operated means to axially move said valve element to open and close said axial passageway and to agitate the powder therein, and a heat intensifier tube having a carbon liner surrounding and extending beyond said burner tip.

References Cited by the Examiner
UNITED STATES PATENTS

| | | | |
|---|---|---|---|
| 346,611 | 8/86 | Root | 110—22 |
| 1,097,263 | 5/14 | Reich | 158—27.4 |
| 1,387,591 | 8/21 | Cooper | 158—27.4 |
| 1,397,519 | 11/21 | Heyman | 158—27.4 |
| 1,957,855 | 5/34 | States | 158—27.4 |
| 2,073,448 | 3/37 | Fruth et al. | 158—27.4 X |
| 2,210,402 | 8/40 | Gaines | 148—9.5 X |
| 2,348,385 | 5/44 | Houghton | 158—27.4 |
| 2,536,201 | 1/51 | Meincke et al. | 110—22 X |
| 2,807,317 | 9/57 | Penno | 158—27.4 X |

FOREIGN PATENTS

| | | |
|---|---|---|
| 549,781 | 5/32 | Germany. |
| 277,186 | 9/27 | Great Britain. |

FREDERICK L. MATTESON, Jr., *Primary Examiner.*

JAMES W. WESTHAVER, *Examiner.*